Figure 2A:
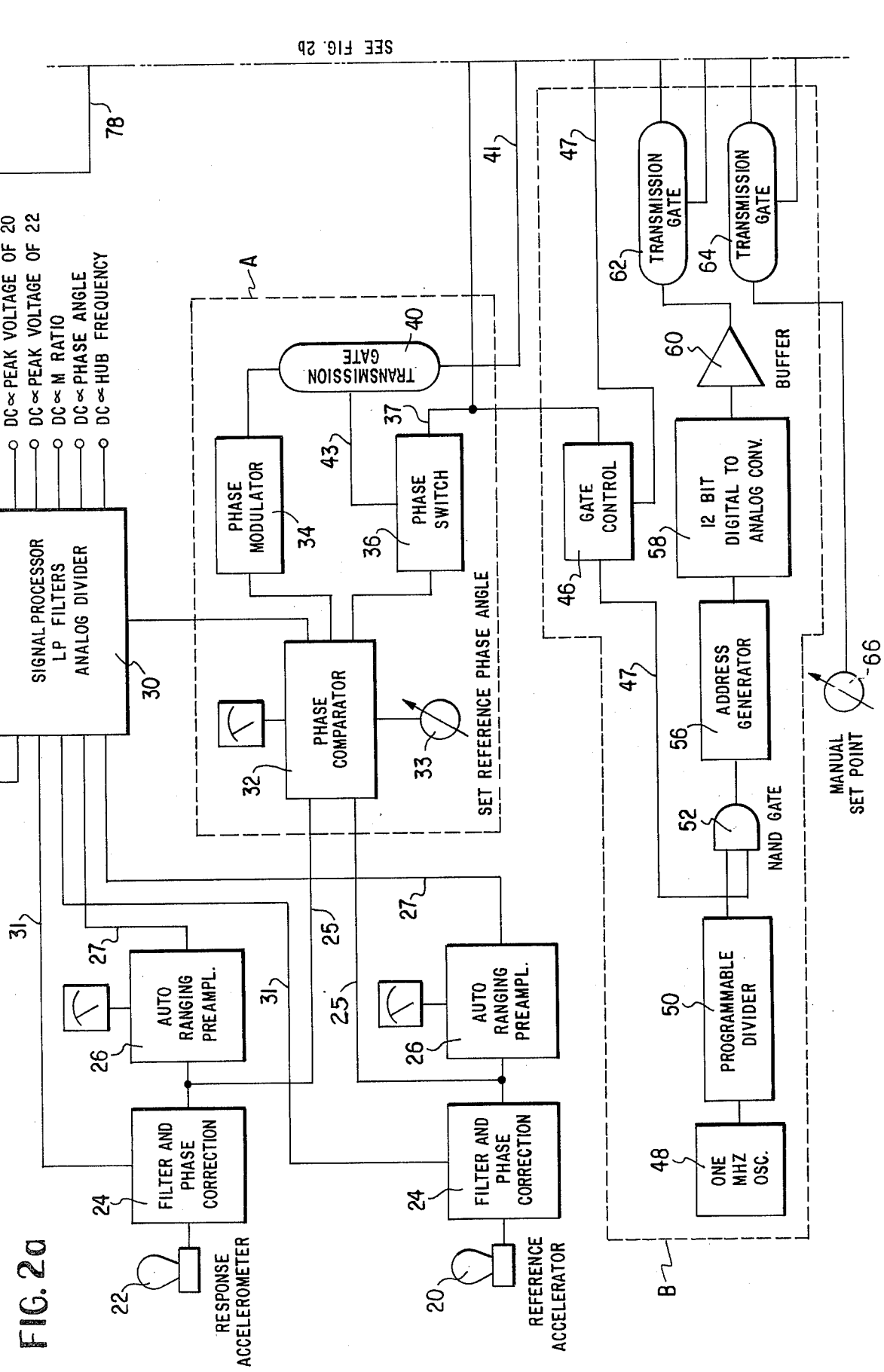

United States Patent [19]

Zinn et al.

[11] 4,300,383

[45] Nov. 17, 1981

[54] CRANKSHAFT DAMPER RESONANCE MONITOR

[75] Inventors: Michael J. Zinn, Noblesville; Robert C. Bremer, Jr., Brownsburg; Lewis E. Williams, Greenfield; Hans O. Haupt, Indianapolis, all of Ind.

[73] Assignee: Wallace Murray Corporation, New York, N.Y.

[21] Appl. No.: 70,312

[22] Filed: Aug. 27, 1979

[51] Int. Cl.³ .................... G01M 13/00; G01H 13/00
[52] U.S. Cl. ........................................... 73/11; 73/579
[58] Field of Search ................................. 73/574–579, 73/662, 663, 664, 11

[56] References Cited

FOREIGN PATENT DOCUMENTS 884406 12/1961 United Kingdom .................. 73/579

Primary Examiner—James J. Gill

Attorney, Agent, or Firm—Thomas J. Greer, Jr.

[57] ABSTRACT

A method and apparatus for testing an elastomeric torsional vibration damper by oscillating the hub thereof on a shaker table to thereby simulate actual conditions of use. Prior testing methods and apparatus have not compensated for changes in the mechanical properties of the elastomer which often occur during testing. Such changes are usually due to build-up of heat within the elastomer. According to the practice of this invention, changes in the mechanical properties of the elastomer are compensated for by continuously monitoring the phase difference between the hub and the inertia ring. If the phase difference varies from a predetermined amount, the hub input frequency is then varied in such a manner as to maintain the predetermined phase difference between the hub and inertia ring. In this manner a predetermined phase difference may be maintained throughout the test.

5 Claims, 16 Drawing Figures

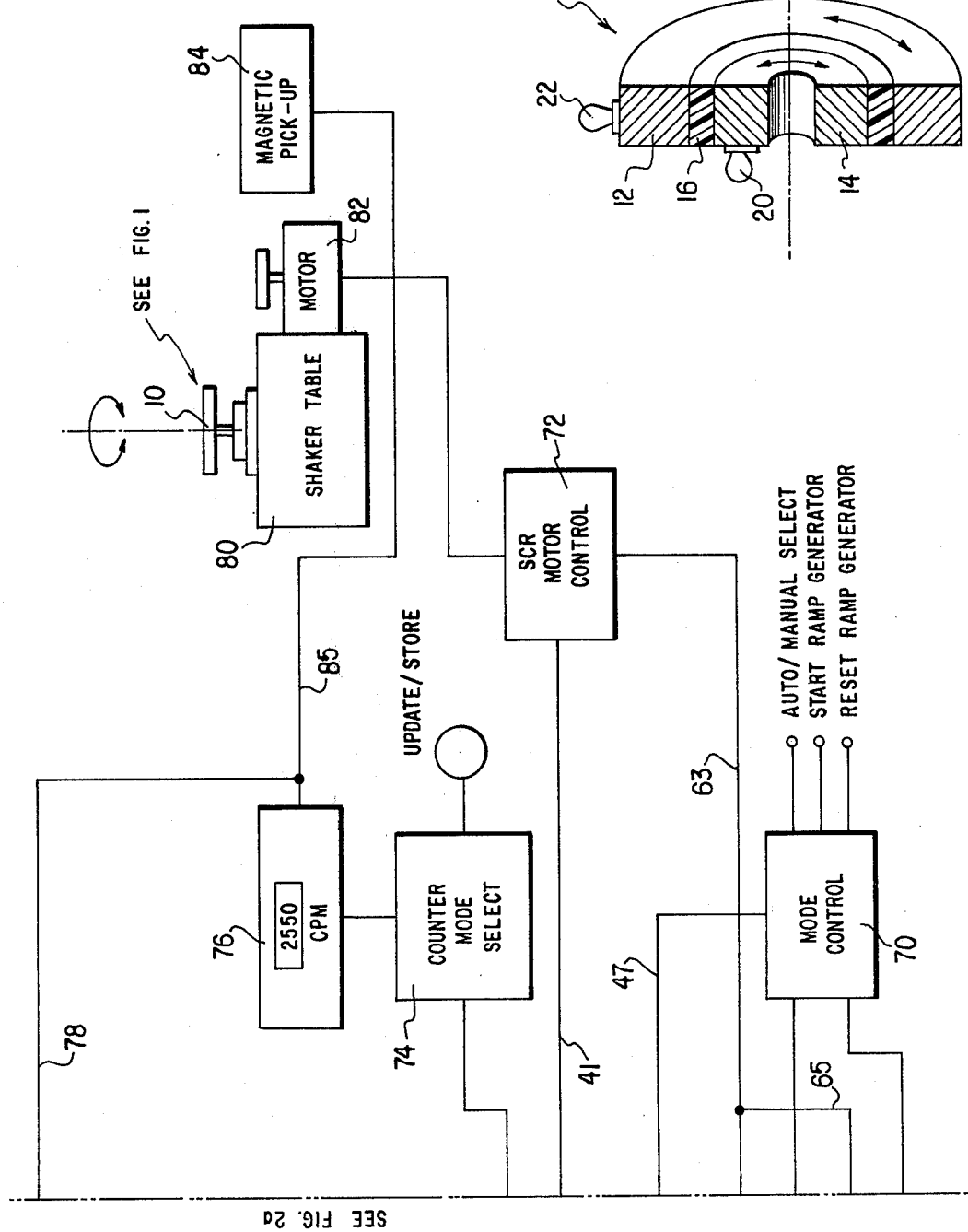

FIG. 5a
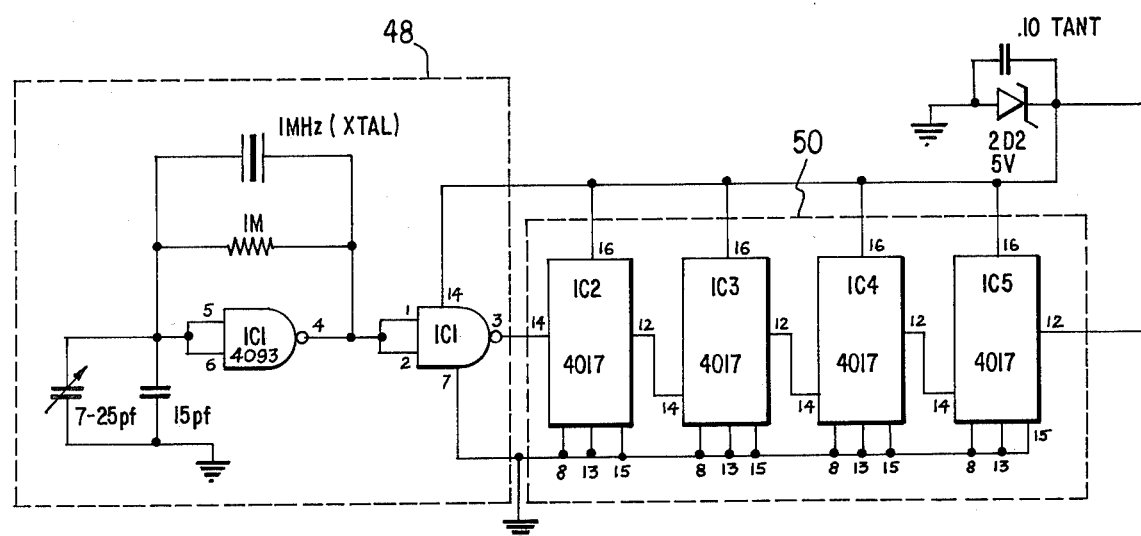
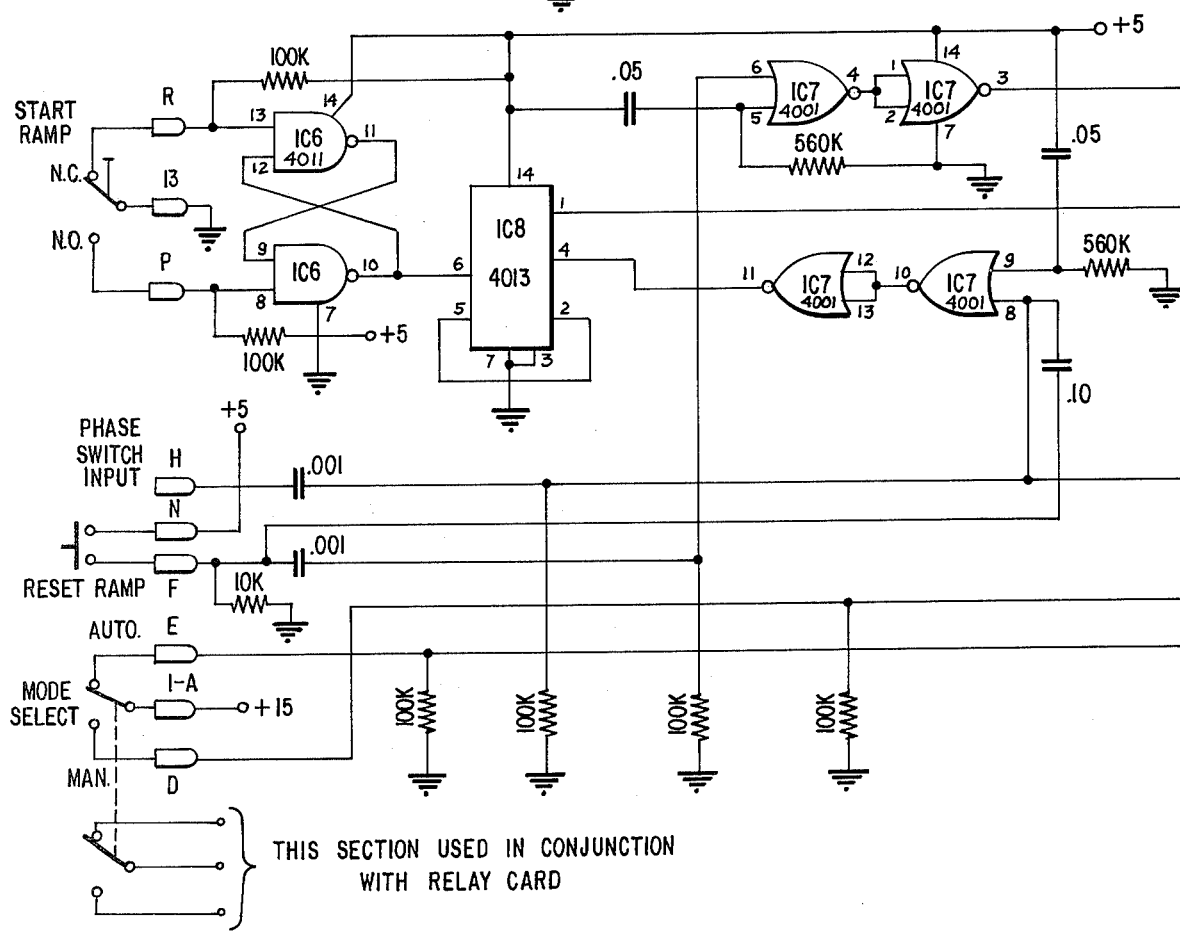

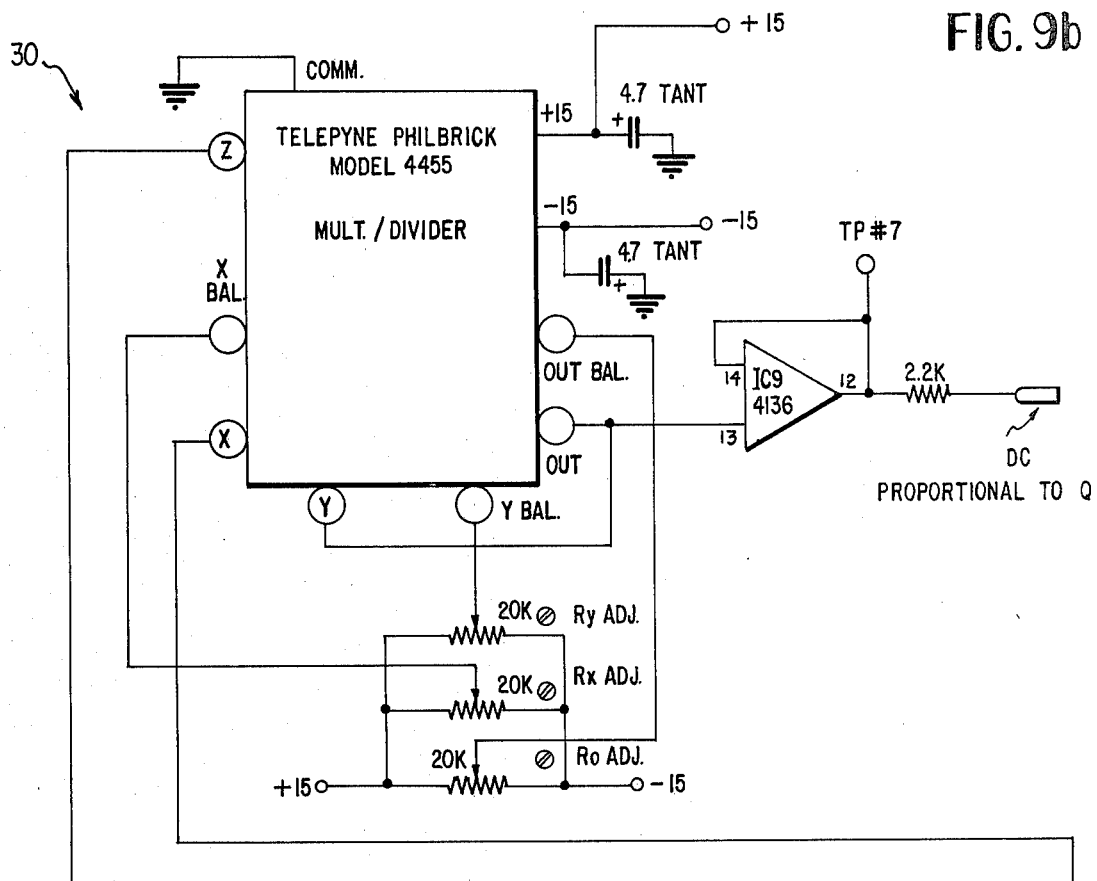
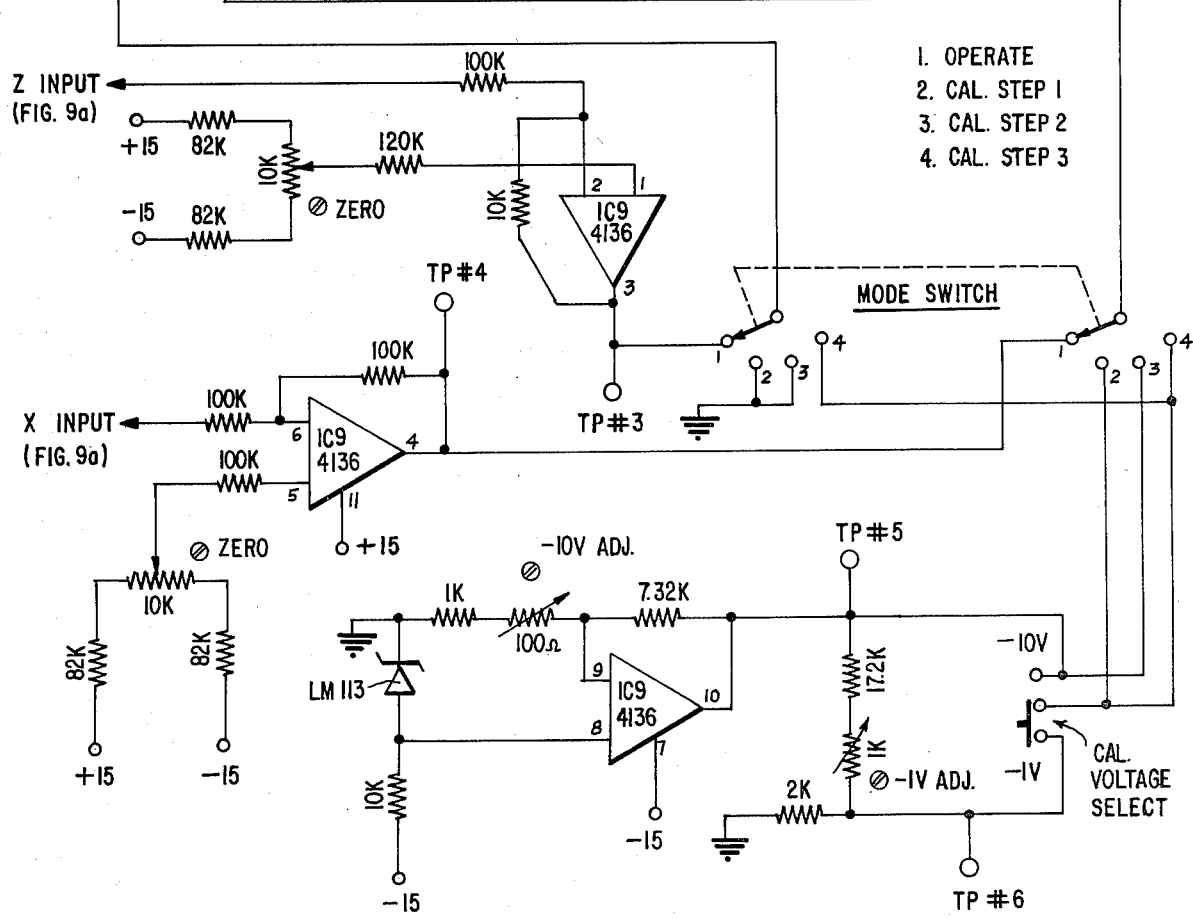
FIG. 9b

CRANKSHAFT DAMPER RESONANCE MONITOR

This invention relates to a method and apparatus for the dynamic testing of torsional vibration dampers. Torsional vibration dampers find extensive application in internal combustion engines and a wide variety of constructions of such devices has evolved over a substantial period. In general, torsional vibration dampers are employed by attachment to the crankshaft of an internal combustion engine. Due to the character of internal combustion engines, during their operation torsional vibrations are set up in the crankshaft and unless damped may reach relatively high angular amplitudes. A possible consequence is shorter life of the crankshaft as well as that of other elements of the engine.

The purpose of a torsional vibration damper is to reduce the amplitude of torsional vibrations. Such reduction lowers the strength requirements of the crankshaft and hence lowers the weight of the crankshaft. The damper has a direct effect on the crankshaft and also inhibits vibration of various other components of the internal combustion engine which are affected by crankshaft vibration.

Torsional vibrations may be considered as back-and-forth twistings of the crankshaft of an internal combustion engine, superimposed upon the main, uni-directional rotation of the crankshaft. Unless controlled, such torsional vibrations will often lead to failure of the crankshaft, as well as contributing to failure in other parts of the engine or its cooling system, particularly where one of the resonant frequency modes of the crankshaft coincides with the particular firing frequency of the engine or a particular harmonic of that frequency. As the crankshaft is turning, each incremental application of torque, as occasioned by rapid fuel combustion in a cylinder, results in a slight acceleration of the metal adjacent the crank arm. When the metal recovers, due to its natural elasticity or resilience, it rotates slightly in the opposite direction. Such forces result in torsional vibration, an engine crankshaft turning at a rate of 3000 rpm simultaneously executes (typically) angular vibrations of an amplitude of from one-fourth degree to one degree at a frequency of 150 to 250 cycles per second. According to present theory of elastomer vibration dampers, the torsional vibrational energy transmitted to the crankshaft by the action of the pistons is converted into heat in the elastomer. The elastomer may accordingly be considered as a drain or sump which continually receives a portion of the energy which causes torsional vibrations.

One torsional vibration damper which has enjoyed wide acceptance for a number of years is defined by a hub, an elastomer ring, and an inertia or outer ring. The hub and the inertia ring are usually formed of iron or other heavy, strong material. The elastomer ring is positioned between the hub and the outer ring, with the hub being attached to the crankshaft. According to the theory currently in vogue, this type of damper functions by the continuous conversion of mechanical energy of vibration into heat energy. As the hub executes torsional vibrations during engine operation, there is a lag or delay between corresponding rotations or oscillations of the inertia ring. This action causes relative rotational movement between the outermost radial portion of the elastomer (which is attached to the inertia ring) and the innermost radial portion of the elastomer (which is attached to the hub), such relative motion resulting in a kneading or working of the elastomer. Such kneading or working results in the build-up of heat in the interior of the elastomer. Thus, the mechanical, rotary torsional vibrational energy transmitted to the crankshaft by the pistons during engine operation is partially transformed into heat by internal friction within the elastomer.

One method for testing torsional vibration dampers has employed a motor driven shaker table upon which a damper to be tested is mounted. The shaker table may be set for a desired rotational, oscillatory frequency and amplitude of the hub. In one such known technique, a decalcomania is placed on the inertia ring. The decalcomania consists of variably spaced, white parallel lines on a black background. During a test for damper resonance, i.e., when the natural oscillatory frequency of the damper is the same as the rotational, oscillatory frequency applied to the hub, the operator adjusts the frequency of the shaker table until a certain optical condition, apparent to the observer looking at the decalcomania, is obtained. In another optical test, a decalcomania having the general outline of the letter V is attached to the inertia ring and an optical pattern is observed.

Other methods and devices for conducting similar tests in this general area are shown in the following U.S. Pat. Nos. 2,733,596 issued to Painter, 3,033,027 issued to Perls, 3,030,803 issued to Painter, 3,162,039 issued to Schloss, 3,699,808 issued to Ford, 3,710,082 issued to Sloane, 3,848,115 issued to Sloane, all hereby incorporated by reference.

While the apparatus described in these patents is successful for carrying out testing, apparently no worker in this art has both recognized and compensated for changes in the mechanical properties of the elastomer which take place during a test or test runs. Mechanical properties of the elastomer are sensitive to changes in temperature resulting from absorption of vibrational energy. It is accordingly difficult to maintain a crankshaft damper in resonance long enough to conduct significant tests of its characteristics. For example, in conducting a damper test using the optical method employing a decalcomania, in order to maintain the damper under test at resonance, the operator would have to (1) continuously observe any changes in the optical pattern presented by the decalcomania and to then (2) continuously adjust the frequency of oscillation transmitted by the shaker table to the hub of the damper, all over long periods of time. The U.S. Pat. No. 3,030,803 to Painter discloses a somewhat similar system as that which is to be described with respect to this invention, however, that patent fails to take into account variation in the mechanical properties of the elastomer under investigation and to compensate for such changes, all for the purpose of maintaining a condition of resonance. The Painter system employs an accelerometer on the shaker table and an accelerometer on an elastomer specimen whose properties are to be measured. The two accelerometer outputs are amplified and processed in such a manner as to yield damping modulus, elastic modulus, and reactive impedance of the test elastomer. The shaker table frequency is not varied. Similarly, the two patents to Sloane, mentioned above, fail to contemplate or recognize the problem of change of elastic properties of the damper under investigation with aging due to strain or with changes in temperature, humidity or the like and accordingly to make compensation for such changes. In the Sloane patents a sample is subjected to a spectrum of frequencies and the resultant spectrum of the output is analyzed.

According to the practice of this invention, recognition of the problem of change in elastomer properties during a damper test is combined with an apparatus for compensating for such changes. The compensation is continuous during the test and involves changing the frequency transmitted to the hub by the shaker table, for the purpose of maintaining a condition of resonance throughout the test. Further, in accordance with the practice of this invention, any desired phase difference (i.e., phase angle) between the hub and the inertia ring may be selected for a torsional damper vibration test and this phase angle automatically and continuously maintained throughout the test. Thus, the invention admits of testing torsional vibration dampers at a condition of resonance as well as any other phase angle between the hub and the inertia ring. It will be understood that the term—phase angle—refers to the maximum angular displacement between the hub and the inertia ring at a particular hub frequency and amplitude.

In the Drawings:

FIG. 1 is a partially schematic, cross-sectional view of a conventional torsional vibration damper of the type having a hub, an inertia ring, and an annular elastomer band, the damper having attached to it a reference accelerometer and a response accelerometer.

FIGS. 2a and 2b, when placed together as indicated, define a block type diagram of the measuring system of this invention, the system measuring the performance of a damper such as that shown at FIG. 1.

Figure 3A:
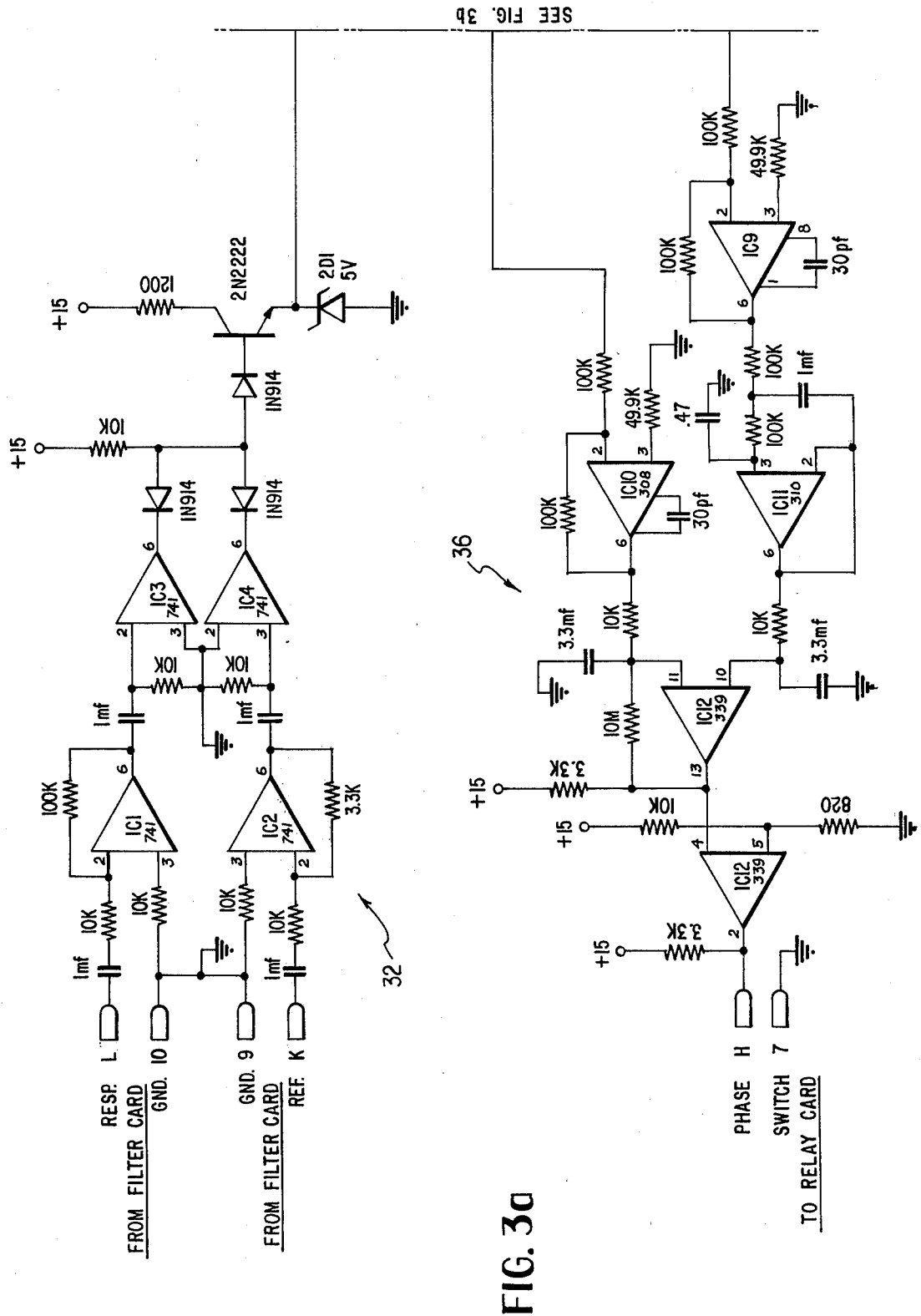
Figure 3B:
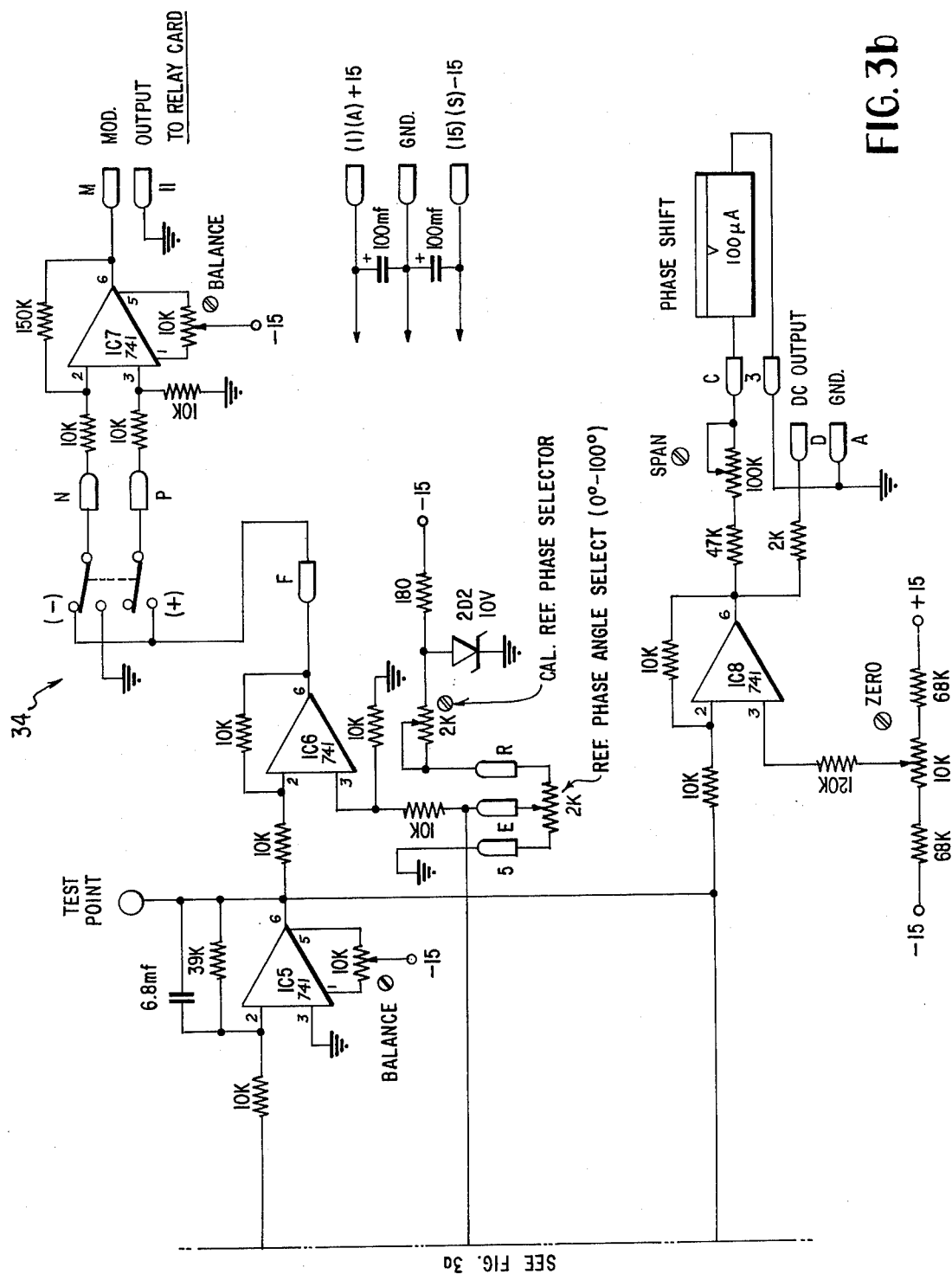

FIGS. 3a and 3b define a circuit diagram of network function elements 32, 34 and 36 of FIGS. 2a and 2b.

Figure 4:
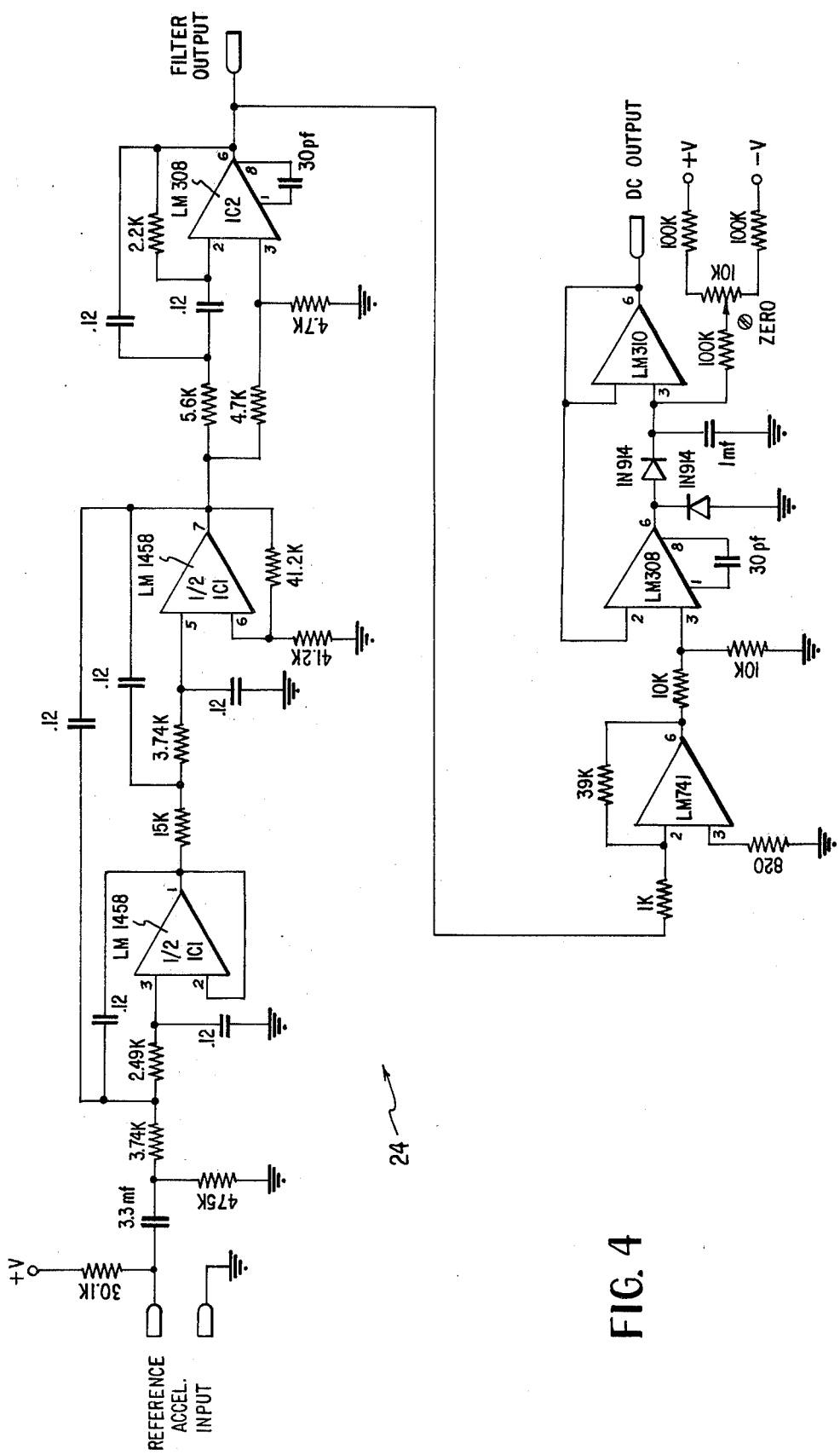

FIG. 4 is a circuit diagram of network function element 24 of FIGS. 2a and 2b.

Figure 5B:
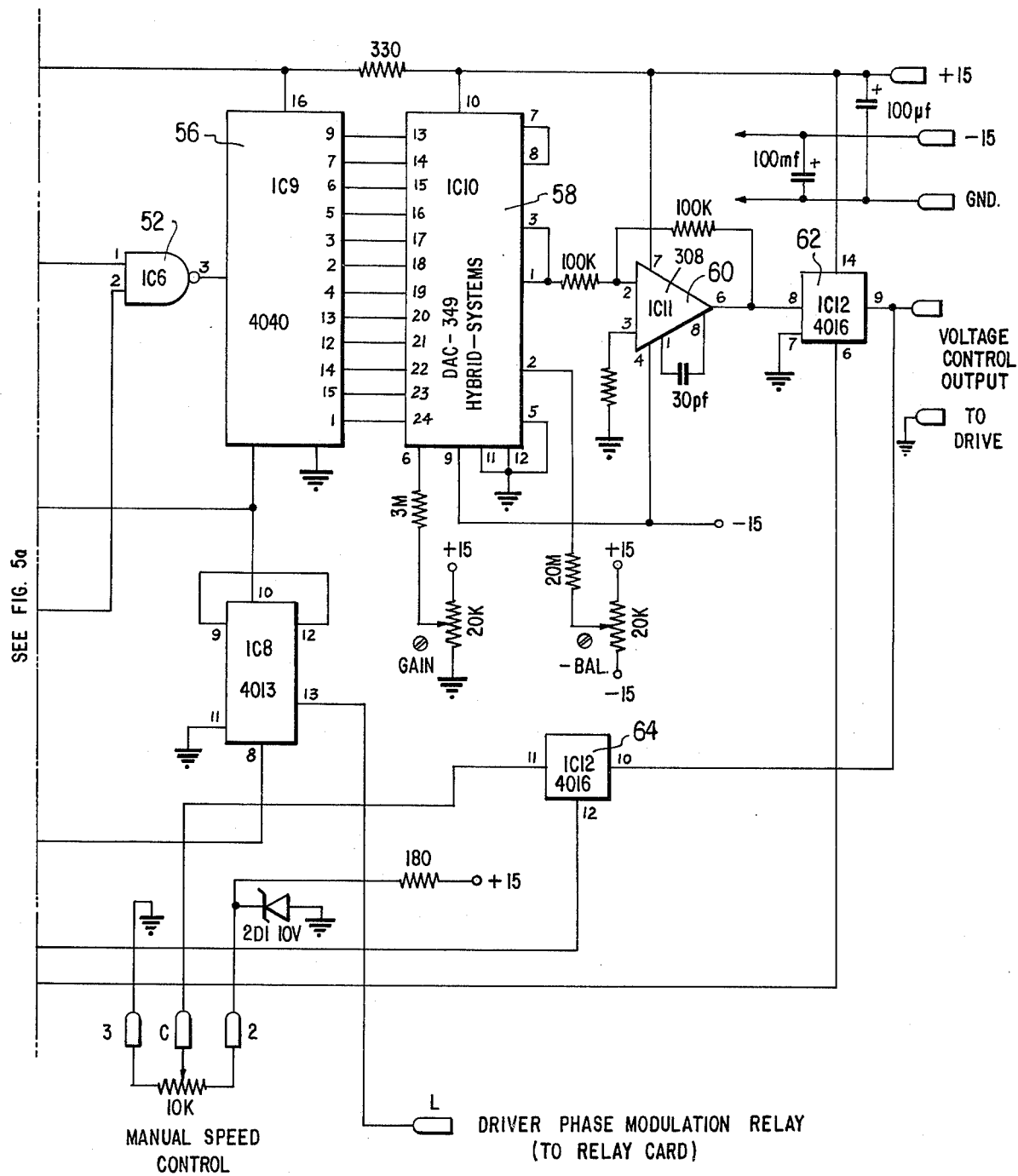

FIGS. 5a and 5b define a circuit diagram of network function elements 46, 48, 50, 52, 56, 58, 60, 62 and 64 of FIGS. 2a and 2b.

Figure 6A:
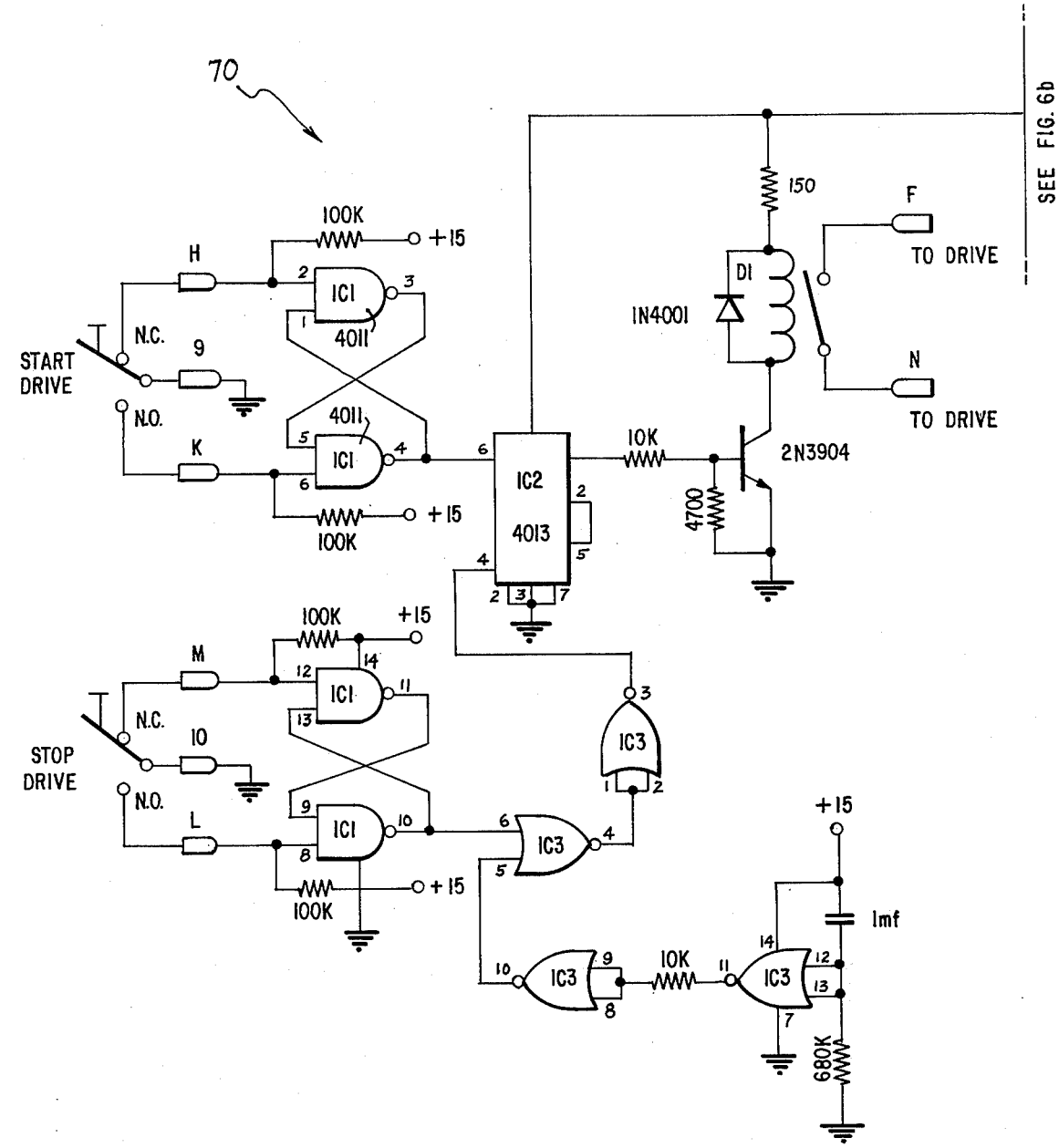
Figure 6B:
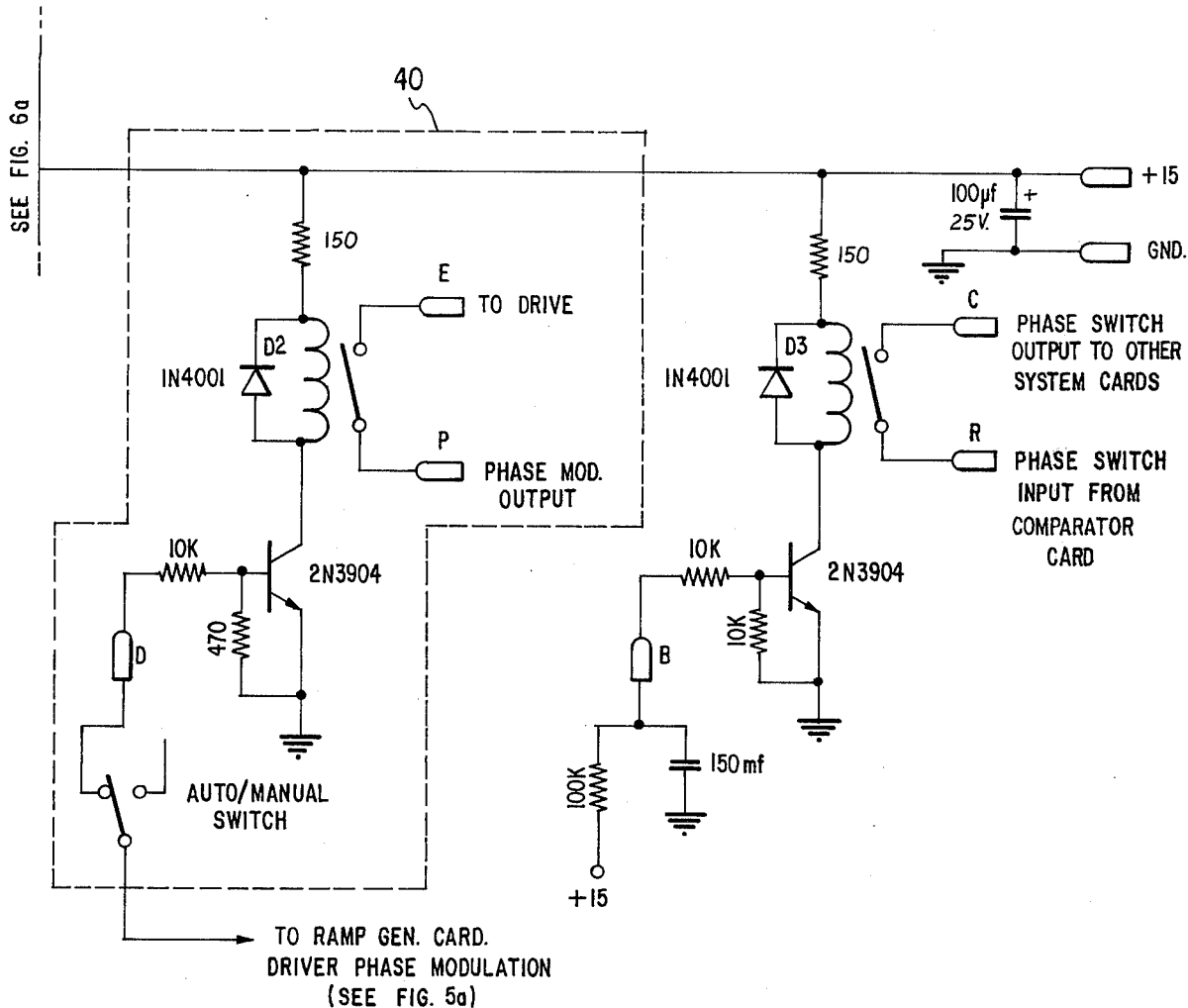

FIGS. 6a and 6b define a circuit diagram of network function elements 40 and 70 of FIGS. 2a and 2b.

Figure 7A:
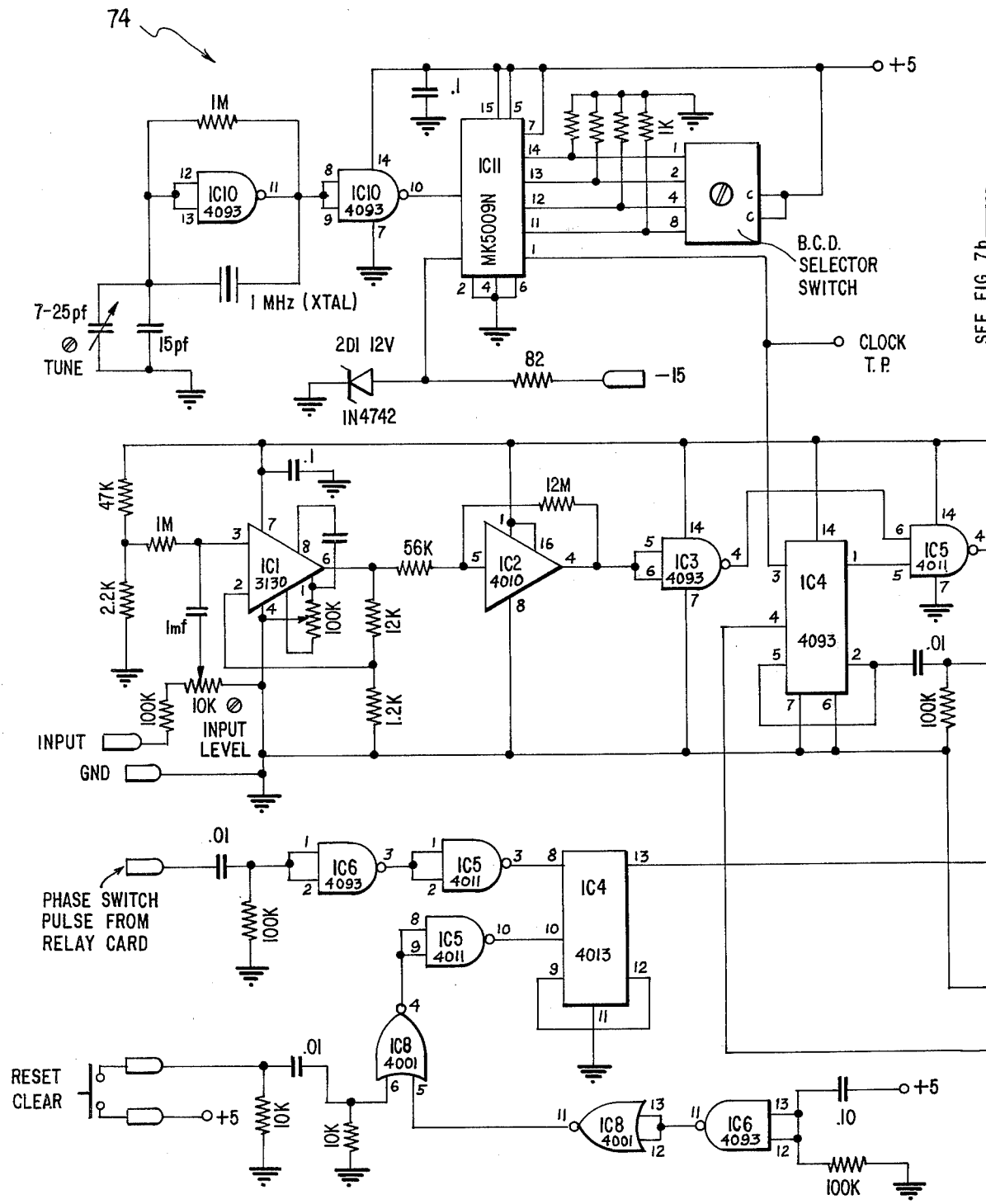
Figure 7B:
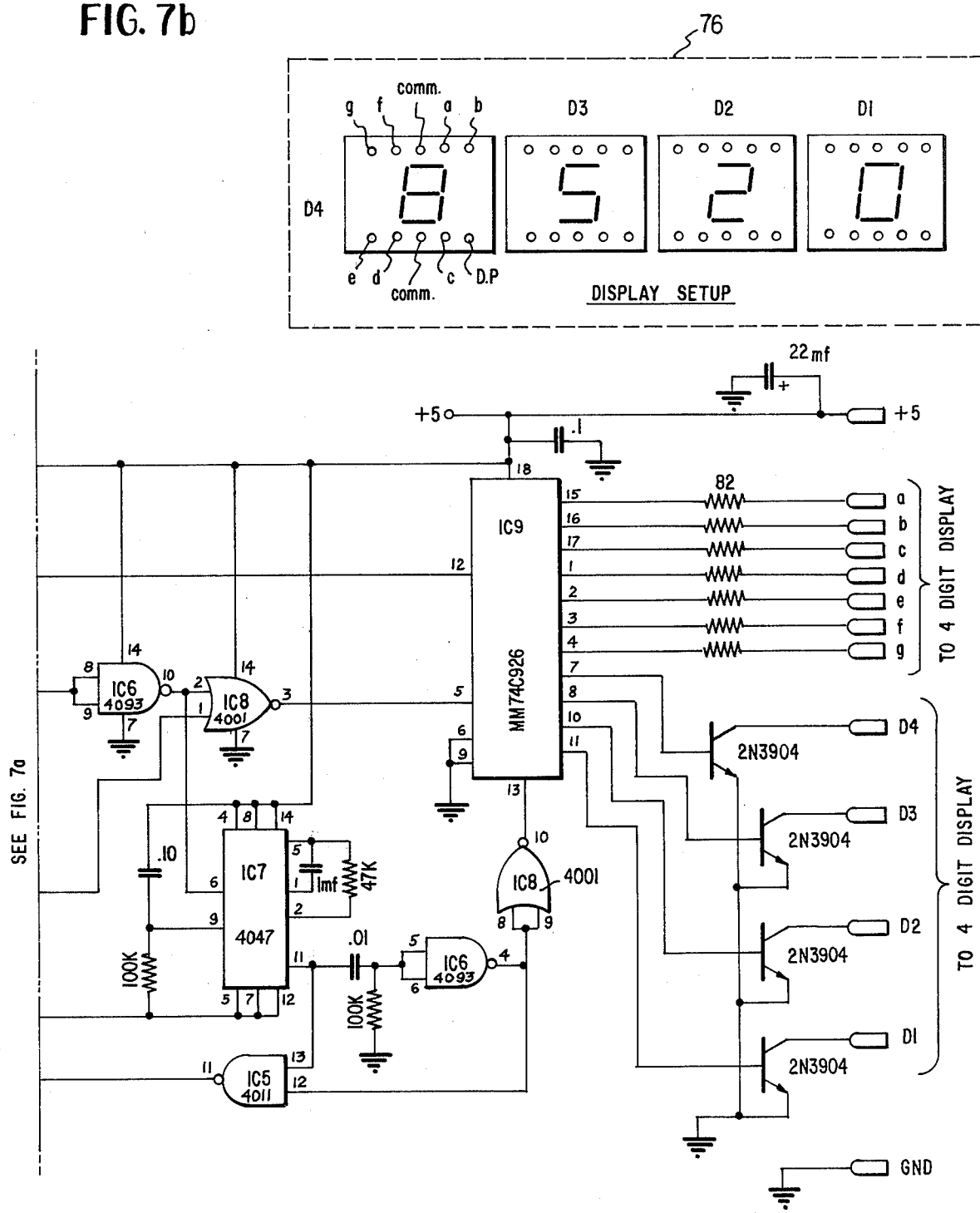

FIGS. 7a and 7b define a circuit diagram of network function elements 74 and 76 of FIGS. 2a and 2b.

Figure 8A:
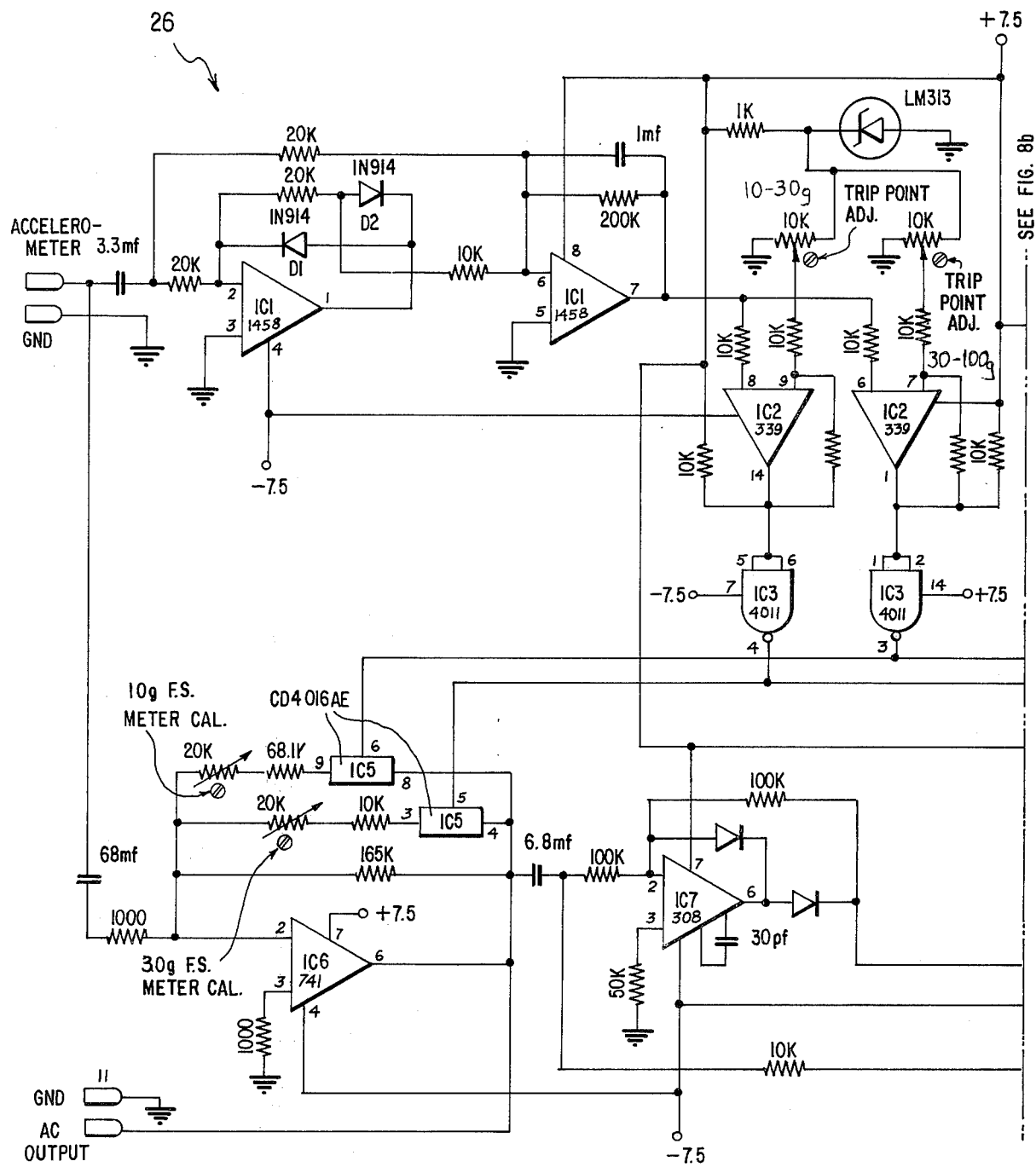
Figure 8B:
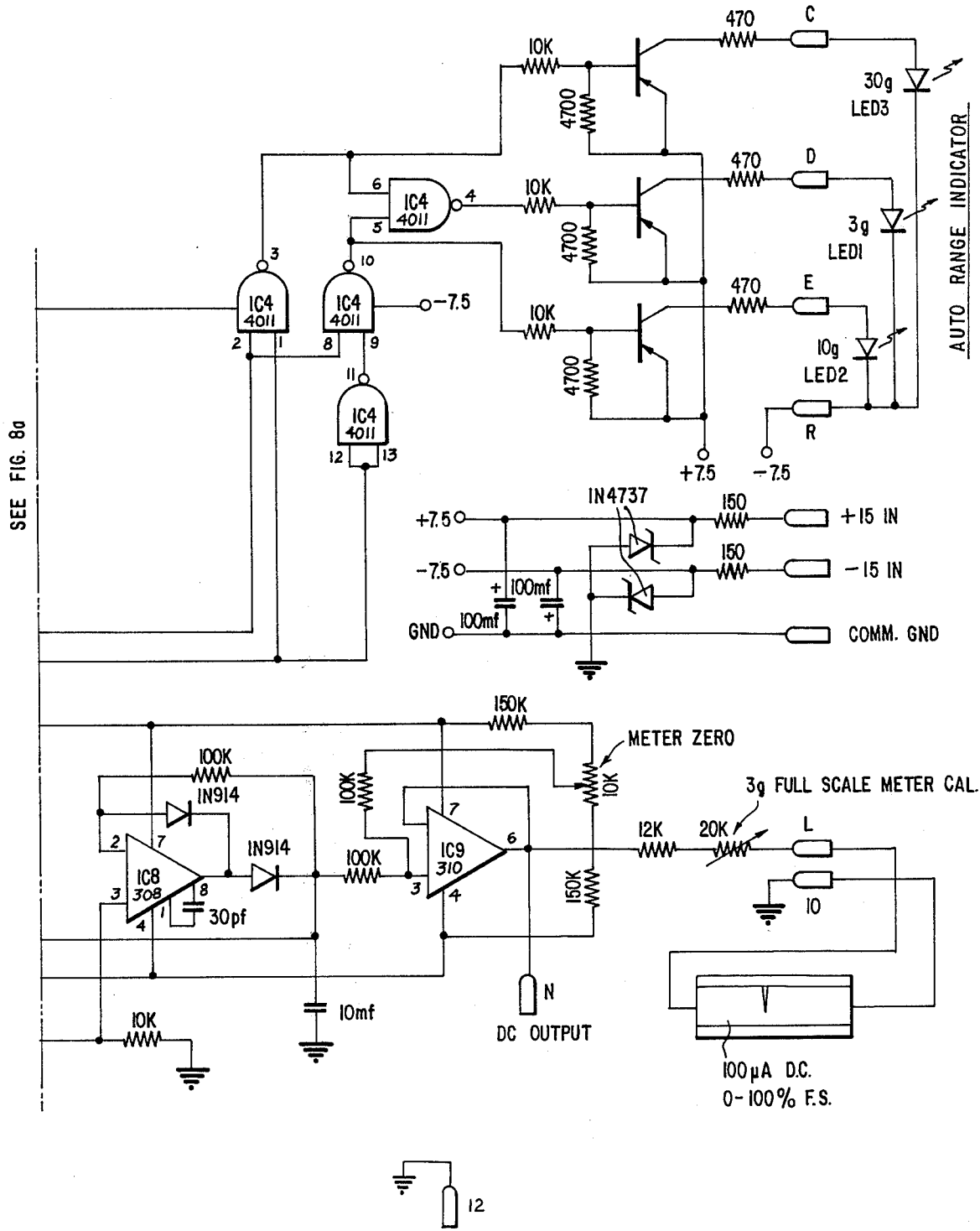

FIGS. 8a and 8b define a circuit diagram of network function element 26 of FIGS. 2a and 2b.

Figure 9A:
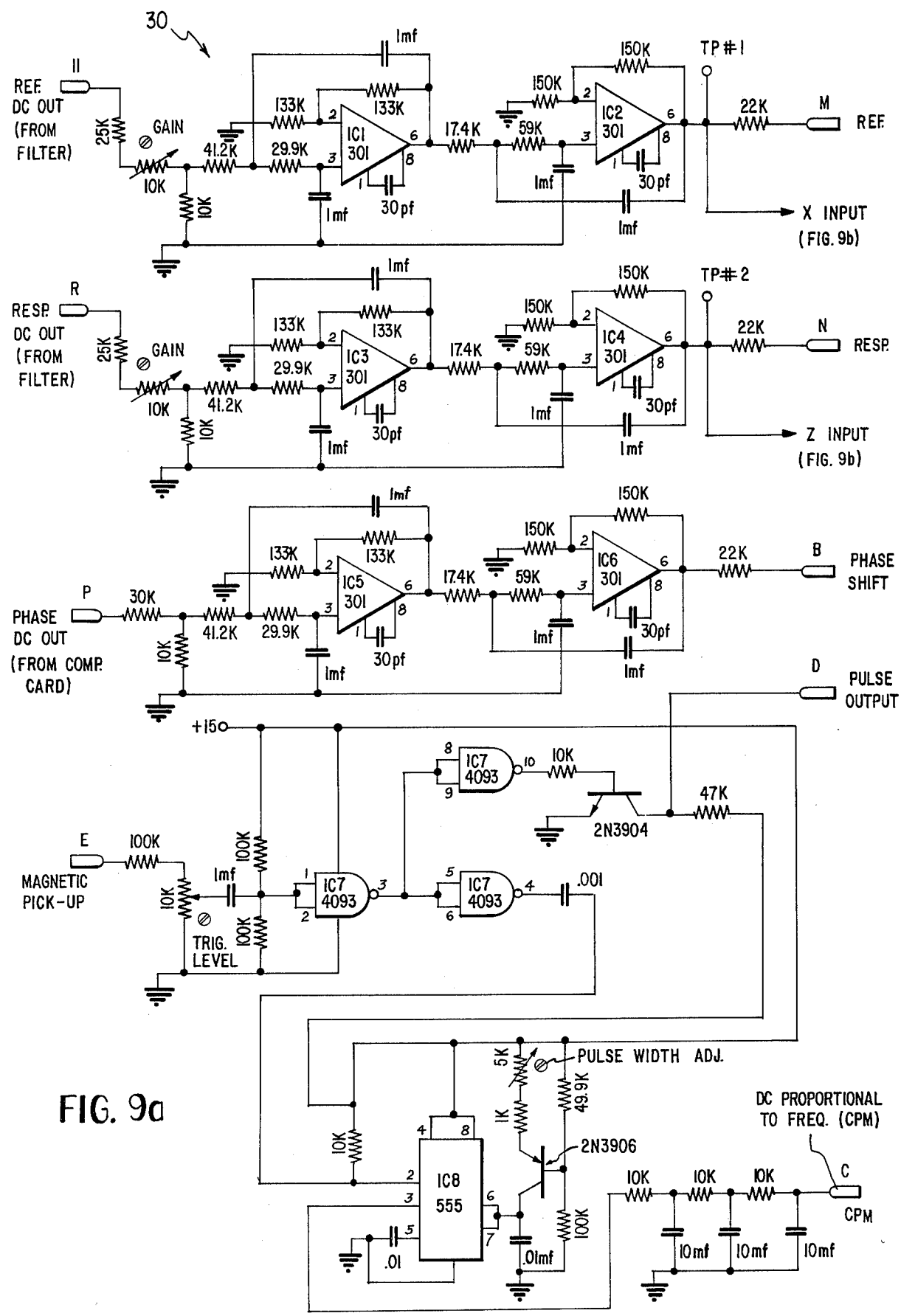

FIGS. 9a and 9b define a circuit diagram of network function element 30 of FIGS. 2a and 2b.

Referring now to FIG. 1 of the drawings, the numeral 10 denotes a typical torsional vibration damper of the type having an outer inertia ring 12 and an inner hub 14. An elastomr ring or band 16 is often bonded as by adhesive to both ring 12 and hub 14. In operation, as well known to workers in the torsional vibration damper art, oscillation of the damper about its axis 18 is in response to forces originating during operation of an internal combustion engine, the engine crankshaft being coupled to hub 14 and also rotating about the same axis 18. The numeral 20 schematically denotes a reference accelerometer, while the numeral 22 schematically denotes a second accelerometer, termed a response accelerometer. Each accelerometer 20, 22 generates an alternating voltage proportional to its rotational acceleration. The hub 14, being rigidly attached to the crankshaft of the engine, will of course follow exactly the rotary oscillations of the crankshaft, while the inertia ring 11, due to its inertia and to the elastic connection defined by element 16, will lag the rotary motion of hub 14. By comparing the voltages of accelerometers 20 and 22, the amount of such lag may be computed or determined.

When the damper such as that of FIG. 1 is placed on a test stand, termed a shaker table in the art, the hub 14 is oscillated about its axis 18, usually at a constant amplitude. The frequency of oscillation (for a fixed amplitude), together with the characteristics of the particular damper, i.e., the stiffness of the rubber 16, the mass of member 12, etc., will determine the phase angle or the phase lag between the hub and the inertia member. By suitably controlling the frequency at which the hub 14 is oscillated about its axis 18, a wide variety of phase angles (synonomously, phase lag angles) between the hub and the inertia member may be realized. Because the mechanical properties of the elastomer 16 change with time during a test of a torsional vibration damper, an initial frequency of oscillation of hub 14 about its axis 18 on the shaker table will not, in general, maintain or result in the same phase lag angle throughout the test. Accordingly, if a predetermined phase angle is to be maintained throughout the test, it becomes necessary, in accordance with this invention, to so vary the frequency of oscillation of hub 14 as to maintain this predesired phase lag angle. A description will now be offered of a system for carrying out this desired control.

Referring now to FIGS. 2a and 2b of the drawings, the numerals 20 and 22 again represent, respectively, the reference and response accelerometers. These devices are well known and readily available as shelf items of commerce. The numeral 24 denotes a filter and phase correction network coupled to each accelerometer, these networks, in turn, each feeding a corresponding preamplifier 26. The numeral 30 denotes a network which includes a signal processor, low pass filters, and an analog divider. Lines 31 carry the output of networks 24 into network 30, while lines 27 feed the output of preamplifiers 26 to network 30. Lines 25 carry, respectively, the outputs of the reference and the response accelerometers after treatment by networks 24 to a phase comparator 32.

A functional circuit denoted by A (see FIG. 2a) includes the phase comparator network 32, a phase modulator network 34, a phase switch network 36, and a transmission gate 40. The phase comparator 32 is coupled to a control 33, control 33 manually setting the desired or predetermined phase angle.

A ramp generator functional circuit is denoted by B (see FIG. 2a) and includes a one MHz oscillator network 48 whose output is coupled to a programmable divider network 50. The output from 50 is fed to one of two terminals of NAND gate 52, the output terminal of gate 52 coupled to an address generator network 56. In turn, the output of 56 is fed to a 12 bit digital to analog converter 58 whose output is fed to buffer 60. A transmission gate 62 receives the output from buffer 60 and is connected by line 63 to an SCR motor control module of standard construction 72. A gate control network 46 is coupled by line 47 to the other terminal of gate 52, the gate control 46 coupled to phase switch 36 by line 37. Line 47 couples gate control 46 to mode control network 70. Yet another transmission gate is denoted by the numeral 64 and also feeds into mode control 70, a manual set point potentiometer 66 being coupled to the other side of gate 64. A counter mode selector network 74 is coupled to line 37, and also to a visual display counter 76. The other terminal of counter 76 is coupled by line 78 to element 30.

The numeral 80 schematically denotes the shaker table (of conventional construction) and includes a motor 82, also schematically denoted. A magnetic pickup 84 measures, in a known manner, the speed of motor 82 and this information is fed to the counter 76 by line 85. The numeral 10, as before, designates a torsional vibration damper under test and is mounted on the shaker table. In practice, it is found convenient to couple the reference and response accelerometers to the damper 10 as by means of clamps, or by welding, or by any other convenient manner.

The mode of operation in the automatic mode of the elements thus far described is as follows.

Assume that the desired phase angle between hub and inertia ring has been pre-set, for example, for 76°. This is set by the potentiometer 33. This setting establishes a first d.c. reference potential. The shaker table 80 commences operation, oscillating the hub 14 of damper 10 rotationally back and forth at a constant amplitude and at a frequency which varies with the magnitude of the voltage fed to motor 82 by the SCR motor control 72. The higher the control voltage, the higher the frequency imparted to the hub by the shaker table. The ramp generator elements within B have also commenced operation and the ramp output voltage (which passes through gate 62 to motor control 72) thus builds up linearly with time. Each accelerometer generates an a.c. voltage proportional to its acceleration as it travels with, respectively, the hub element and the inertia ring element. These two potentials are each fed to filter and phase correction networks 24 whose function is to normalize phase shift. From there, each accelerometer potential is fed to an automatic ranging preamplifier 26. One function of preamplifier 26 is to make possible, on a single scale, readings of three ranges of accelerations. For example, the entire system is capable of measuring accelerations from zero to thirty G's. The output of the automatic ranging preamplifier in lines 27 is a direct current voltage. These two accelerometer voltages will, in general, be different because the acceleration of the hub at any one time is different from the acceleration of the inertia ring. The phase comparator 32 compares (1) the difference in phase between the two accelerometers with (2) the pre-determined reference potential (corresponding to the desired phase angle) set by the potentiometer 33. The reader is here reminded that a difference in magnitude and phase between the outputs of the two accelerometers corresponds to a relative motion between the hub and the inertia ring of damper 10.

Assume now that sometime after the shaker table and ramp generator have started, the difference between (1) and (2), above, is equal to the reference set point. This condition indicates that the desired frequency of hub oscillation at the shaker table has been reached and that the ramp generator is no longer to continue increasing its voltage to thereby further increase the frequency of the shaker table. The gate control 46, operated by phase switch 36, now stops the build-up of the ramp voltage, a now constant potential from the ramp generator being fed (as before) from the transmission gate 62 into the SCR motor control 72 by line 63.

The phase switch 36 at this time also closes the previously open transmission gate 40 through line 43. From this time on, transmission gate 40 remains closed, passing signals, and the phase modulator 34 transmits a d.c. voltage proportional to the phase error through line 41 to the SCR motor control 72. This voltage in line 41 is termed an error voltage. Its magnitude represents the magnitude of departure of the actual phase angle of the damper corresponding to the setting of potentiometer 33. This d.c. voltage varies in both magnitude and in sign, that is to say, it may be either a positive or a negative voltage. If, for example, assuming the predetermined phase angle of 75°, changes in the elastomer 16 of the damper during the test cause the shaker table to result in a phase difference of 80° between the hub and the inertia ring, then the d.c. error voltage passing through the transmission gate 40 will cause the motor control 72 to change the voltage fed to the shaker table motor 82 such that the shaker table frequency will change in such a manner as to thus bring the phase difference back to 75°. The error voltage in line 41 is thus algebraically summed with the (now constant) voltage from the ramp generator, the summation taking place in motor control 72. The d.c. voltage transmitted by the phase modulator 34 will now become constant and the shaker table will now operate at this second frequency (at least temporarily) to maintain the pre-set phase angle.

Assume now that temperature and/or environmental changes act on the elastomer on the damper 10 under test in such a manner as to result in a phase difference between the ring and the hub of 70°, thus 5° less than the desired phase difference. In this circumstance, the phase modulator 34 will again generate a d.c. error voltage (but of opposite sign) which is fed through transmission gate 40 to the SCR motor control 72. Again, the error voltage is there algebraically summed with the now constant output voltage from the ramp generator. The voltage to the shaker table motor will now be changed in such manner as to bring the damper phase difference up to 75° (again, at least temporarily).

Thus, whenever the actual phase angle departs from the predetermined phase angle, one or the other of the above described actions will take place.

For display and recording purposes, the frequency of the shaker table is sensed by magnetic pickup of the type employing a 60 tooth gear (a conventional mode of speed measurement).

In the manual set point control mode, the ramp generator is not employed and the shaker table frequency is determined by the setting of potentiometer 66. In this mode, the transmission gate 62 from the ramp generator is open and the transmission gate 64 from the manual set point potentiometer 66 is closed. This manual setting defines a d.c. potential which is transmitted to the SCR motor control 72 and, as before, determines an operating point or operating potential fed to motor 82. No error voltage appears in line 41 because mode control 70 selects the manual mode, inhibiting gate control 46, through line 47, maintaining transmission gate 40 in an open condition. Hence, SCR motor control 72 will receive only one voltage, that from line 64, 63.

In the manual mode, the shaker table operates at a pre-set frequency, thus vibrating the hub at a constant frequency, independent of any changes which may take place in the elastomer during this time. Thus, in the manual mode, the entire system operates as in the prior art systems and no frequency compensation will be made for elastomer changes.

It will be observed that transmission gate 40 is open, not passing signals, until the phase switch 36 operates to close it. Before closing of switch 36, the d.c. voltage proportional to the error between the actual phase difference and the desired phase difference cannot therefor be transmitted to the SCR motor control 72.

Mode control circuits 70 determine whether automatic or manual operation will take place. Magnetic pickup 84 monitors the frequency of the shaker table by counting a 60 tooth gear with a magnetic pickup and may be set up to store the resonant frequency or continuously monitor the resonant frequency shift, as the phase angle is being maintained. Counter 76 yields a visual display of frequency. The circuits in network 30 yield potentials which correspond to the indicated information, the several terminals indicated coupled to conventional recording or display devices.

Referring now to FIGS. 3a–9b, a complete schematic representation of the system above-described appears. FIGS. 3a and 3b are to be placed together as indicated. FIG. 4 is complete by itself. FIGS. 5a and 5b are to be placed together as indicated. FIGS. 6a and 6b are to be placed together as indicated. FIGS. 7a and 7b are to be placed together as indicated. FIGS. 8a and 8b are to be placed together as indicated. Similarly, FIGS. 9a and 9b are to be placed together as indicated.

The reader need only follow the schematic representations of these figures in order to make and use the system described in FIGS. 1 and 2a, 2b. Those working in this art will recognize that the various components there schematically shown are so-called shelf items and are thus readily available.

The following mathematical relations are given for a more complete understanding of the theory and purpose of the testing method and system of this invention.

The maximum ratio of ring amplitude or response amplitude to the hub amplitude or reference input amplitude is well known and is given by the following equation:

$$M = \sqrt{\frac{1 + C_p^2}{(1 - R^2)^2 + C_p^2}}$$

where
$C_p = cw/K$, a dimensionless quantity based on elastomer properties of the damper
M = amplitude ration or transmissibility
C = an empirical constant
w = angular velocity   k = a constant $$R = \frac{\text{excitation frequency}}{\text{natural frequency}}$$

The phase angle relationship may be defined by the following equation:

$$\theta = \text{Arctan}(C_p) - \text{Arctan}\left(\frac{C_p}{1 - R^2}\right)$$

at resonance, R = 1 and the quantity $$\left(\frac{C_p}{1 - R^2}\right) = \infty.$$

The Arctan $(\infty) = 90°$, hence $$\theta = \text{Arctan}(C_p) - 90°.$$

The dimensionless quantity $C_p$ is based on rubber properties which are extremely sensitive to environmental conditions.

We claim:

1. An apparatus for testing a torsional vibration damper, the damper being of the known type having a hub and an inertia ring coupled thereto by elastomer, the apparatus including a shaker table for rotationally oscillating the hub of a damper to thereby simulate actual conditions of usage of the damper, means for continuously measuring the phase angle between the hub and the inertia ring of the damper, the improvement comprising, means for varying the frequency of oscillation of the hub so as to maintain a desired, predetermined phase angle between the hub and inertia ring, whereby compensation is made for changes in mechanical properties of the elastomer over the period of time of damper testing, such changes being caused by heat generated within the elastomer and changes in the environment.

2. An apparatus for testing a torsional vibration damper including a shaker table for rotationally oscillating the hub of a damper of the known type comprising a hub, an elastomer and an inertia ring, the shaker table being of the type whose frequency of oscillation is proportional to the voltage fed to it, the apparatus comprising,
   (a) a ramp generator whose output voltage is fed to the shaker table, the ramp generator producing an increasing output voltage after its own operation is commenced,
   (b) means for generating a voltage (termed a first voltage) corresponding to the actual phase angle between the hub and the inertia ring which occurs during operation of the shaker table,
   (c) means for establishing a voltage (termed a second voltage) corresponding to a desired, predetermined phase angle,
   (d) means for comparing the first and second voltage,
   (e) means for stopping the voltage increase of the ramp generator to the shaker table when the said compared first and second voltages become equal after the apparatus commences its operation, so that the ramp generator thereafter feeds a fixed voltage to the shaker table.

3. The apparatus of claim 2 including,
   (a) means for generating an error voltage, said error voltage corresponding to deviation of the actual phase angle from the desired, predetermined phase angle, in turn corresponding to the initial, fixed ramp voltage, which occur during the testing due to changes in the mechanical properties of the elastomer,
   (b) means for feeding the said error voltage to the shaker table so that it algebraically combines with the voltage fed to the shaker table by the ramp generator, to thereby cause the voltage seen by the shaker table to be the algebraic summation of (1) the now constant ramp generator voltage, and (2) the error voltage, so that the shaker table frequency is continuously varied whenever required to maintain the desired phase angle between the hub and the inertia ring in spite of any changes in the mechanical properties of the elastomer which may occur during the test of the damper.

4. A method for testing a torsional vibration damper, the damper being of the known type having a hub and an inertia ring coupled thereto by elastomer, the method including the step of causing the hub to execute rotational oscillations at a frequency which produces a desired, predetermined phase angle between the hub and the inertia ring of the damper to thereby simulate actual conditions of usage of the damper, the improvement comprising the additional steps of, (a) continuously measuring the phase angle, (b) varying the oscillation frequency of the hub whenever the measured phase angle during testing is different from the predetermined phase angle, (c) whereby compensation is made for changes in the mechanical properties of the elastomer which often take place during the testing to thereby maintain the predetermined phase angle during the testing in spite of such changes in the mechanical properties of the elastomer.

5. A method for testing a torsional vibration damper, the damper being of the known type having a hub and an inertia ring coupled thereto by elastomer, the method including the steps of, (a) bringing up the rotary, oscillatory frequency of the damper linearly from rest to a first oscillatory frequency, the first frequency corresponding to a desired, predetermined phase angle, (b) thereafter continuously measuring any departure from the desired, predetermined phase angle and then varying the oscillation frequency of the hub so as to maintain the desired, predetermined phase angle.

* * * * *